Jan. 8, 1929.

T. W. ADAMS

1,698,250

TUBE CUTTING MACHINE

Filed June 3, 1927

Inventor
Thomas W. Adams
By his Attorney

Jan. 8, 1929.

T. W. ADAMS

1,698,250

TUBE CUTTING MACHINE

Filed June 3, 1927

Jan. 8, 1929.  T. W. ADAMS  1,698,250
TUBE CUTTING MACHINE
Filed June 3, 1927   6 Sheets-Sheet 5

Inventor
Thomas W. Adams
By his Attorney

Patented Jan. 8, 1929.

1,698,250

UNITED STATES PATENT OFFICE.

THOMAS W. ADAMS, OF ROCHESTER, NEW YORK, ASSIGNOR TO M. D. KNOWLTON COMPANY, OF ROCHESTER, NEW YORK, A CORPORATION OF NEW YORK.

TUBE-CUTTING MACHINE.

Application filed June 3, 1927. Serial No. 196,351.

The invention relates to a tube cutting machine designed to sever multiple sections of uniform length from a tube fed continuously through the machine and has for its object to improve and simplify the actuating and controlling mechanisms of tube cutting machines of the type shown in the patents to Hawkins No. 1,619,975 dated March 8, 1927, and Seymour No. 1,626,878 dated May 3, 1927, and to adapt such type of machine to cutting multiple sections from a continuously fed tubing and to discharge the cut sections from the machine in the intervals between successive cutting operations, so that the cutting machine may be effectively operated at sufficient speed to take care of the output of a tube forming machine under all normal conditions of operation of the latter.

The invention in one form thereof is illustrated in the accompanying drawings, in which:—

Fig. 3ª is a detail view of the tube supporting mandrel and the associated gang of cutters.

Fig. 3ᵇ is a section on the line 3—3 of Fig. 3ª.

Fig. 4ª is a front elevation, partly in section, of the mechanism shown in Fig. 4.

Fig. 4ᵇ is a section on line 4—4 of Fig. 4ª.

Fig. 5 is an enlarged side elevation of certain of the controlling and operating devices shown in Fig. 1.

Fig. 5ª is a fragmentary side elevation on an enlarged scale showing the trip mechanism and the coordinated discharging means.

Fig. 5ᵇ is a sectional plan view of part of the mechanism shown in Fig. 5ª, the section being taken on line 5—5 of Fig. 5ª.

Fig. 5ᶜ is a plan view of part of the mechanism shown in Fig. 5.

Figure 1:
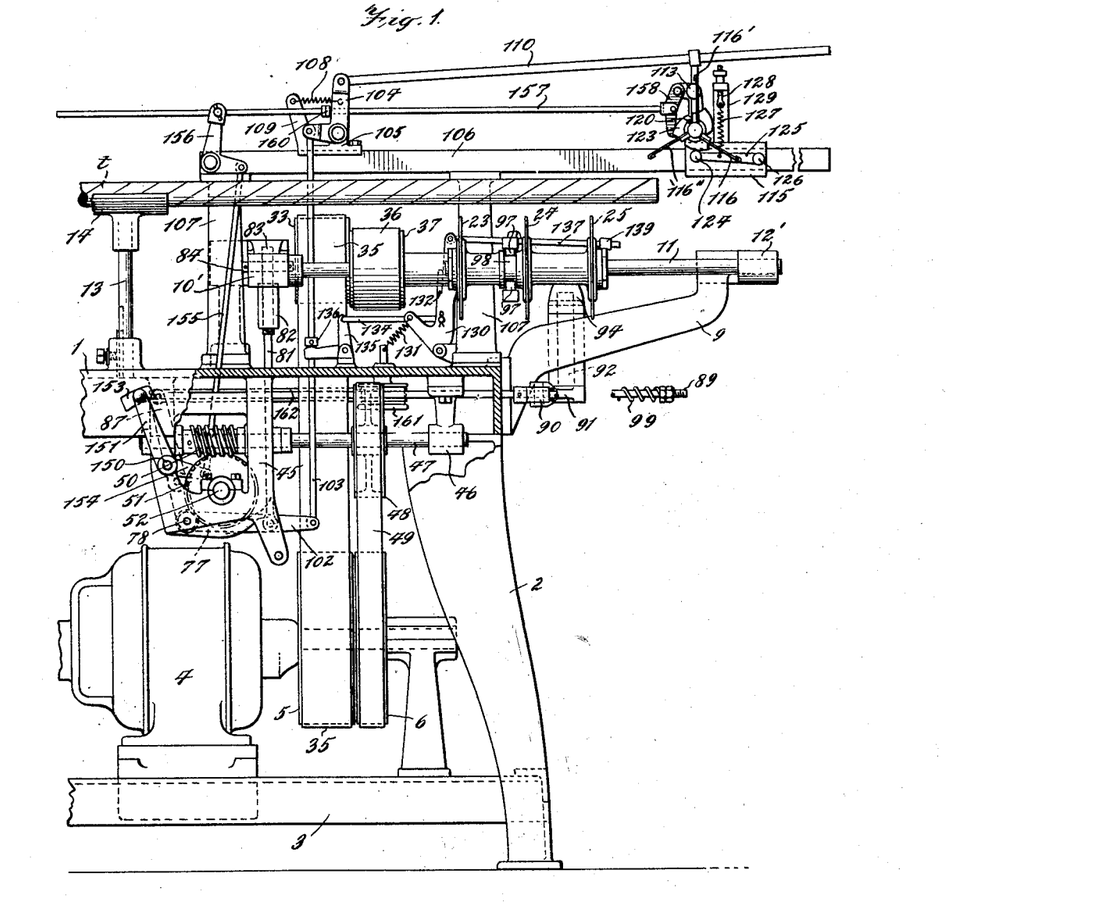
Fig. 1 is a side elevation, partly in section, of the complete machine.
Figure 2:
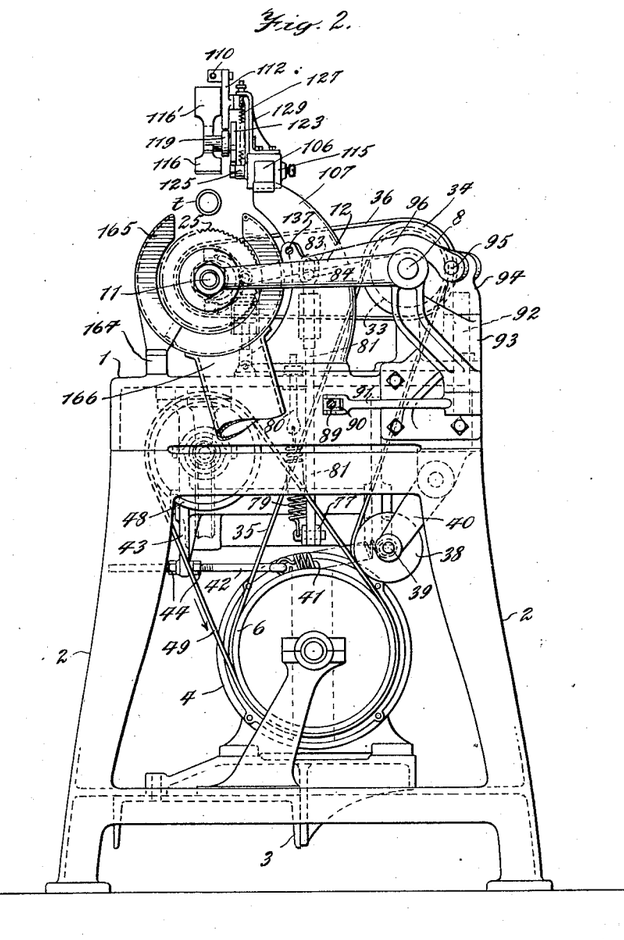
Fig. 2 is an end elevation of the machine.

Referring to Figs. 1 and 2 of the drawings, 1 indicates the bed or table of the machine, which is supported by suitable legs 2 connected at their bottoms by a cross beam 3 which constitutes a support for a suitable electric motor 4 for operating the mechanism, upon the shaft of which motor are mounted belt pulleys 5 and 6. As shown more particularly in Fig. 3, the frame of the machine constitutes a continuation of the frame of a tube forming machine, which may be of usual construction and operation, in which a continuous length of tubing is produced by overlapping spirally wound strips of paper or the like a, a, cemented together by any suitable adhesive, and which tubing is fed forward upon its supporting mandrel with a continuous movement by the winding and feeding belt b. While the machine of the present invention may be conveniently associated with a tube forming machine and, if desired, may constitute a component part of the latter, it is to be understood that the invention is not limited to such association, but the tube cutting machine may be built and operated as a separate unit entirely disassociated from the tube forming mechanism, in which case suitable means are provided for feeding the tubing in continuous lengths into the cutting machine.

Adjustably secured on the top of table 1 are pedestals 7, 7' in which is journaled a horizontal shaft 8, the outer end of which is also journaled in a bearing 9' on a bracket 9 secured to the front end of the table. Keyed to the shaft 8 in proper spaced relation are two arms 10, 10 provided at their ends with journal bearings 10', 10', which support an arbor 11, the outer end of which is journaled in a bearing 12' on arm 12 keyed to the outboard end of shaft 8, the several parts being so arranged that the arbor 11 is adapted to be swung about the shaft 8 as an axis.

Also mounted on the top of the table 1 is a vertically adjustable pedestal 13 carrying at its upper end a trough-like member 14, adapted to receive the tubing to be cut, which tubing, indicated at $t$, is shown as supported on a mandrel 15, said mandrel also constituting a part of the tube forming machine upon which the strips of paper are wound in making up the tube and the mandrel being continued through the cutting machine above and in parallelism with the arbor 11, to constitute a support for the tubing and the sections being cut, the extreme end of the mandrel being beyond the outer limit of the traverse of the cutting mechanism to be hereinafter described.

Figure 3:
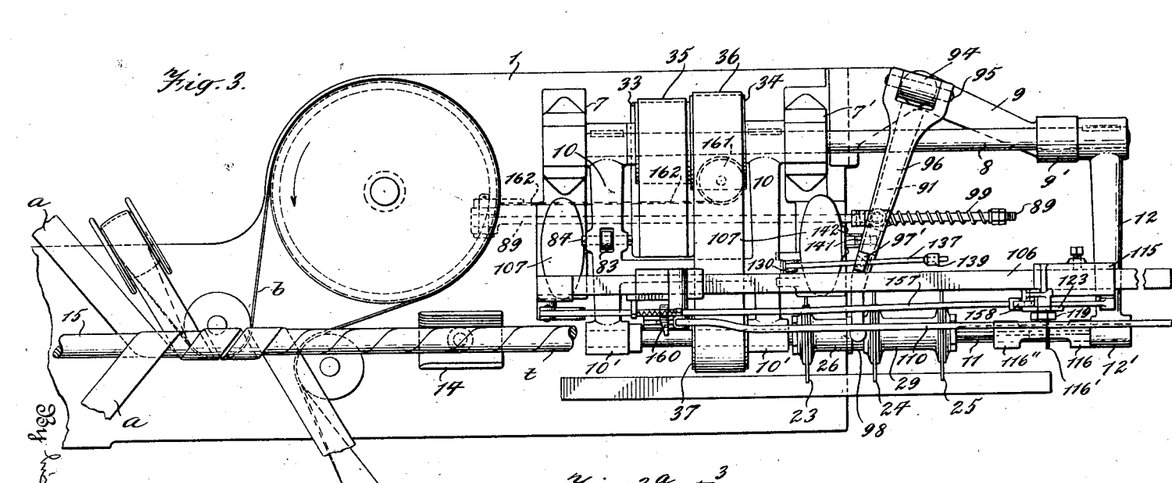
Fig. 3 is a plan view of the machine associated with a tube forming machine.
Figures 3A, 3B:
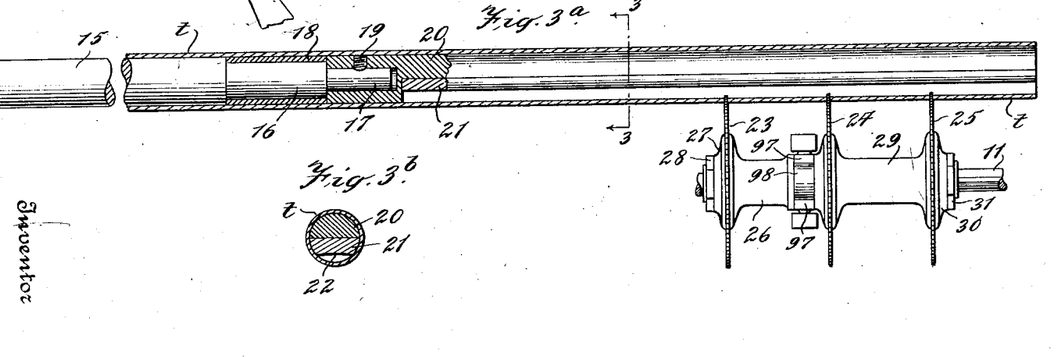

As shown in Figs. 3ª and 3ᵇ, a preferred form of mandrel includes a main body section 15 which is cylindrical, and end sections 16 and 17, on the former of which is fitted a thimble 18. Socketed upon the extension 17 and secured thereto by set-screw 19 is a semi-cylindrical extension 20 of the mandrel 15, to which is secured a bottom facing strip 21 of wood or the like, the lower face 22 of which is curved to conform to the curvature of the saws or cutting elements, said facing strip being provided to prevent damage to the edges of the saws or cutters, in the event that the latter are projected into actual contact with the mandrel during the cutting operation.

Figures 7, 9, 10, 11:
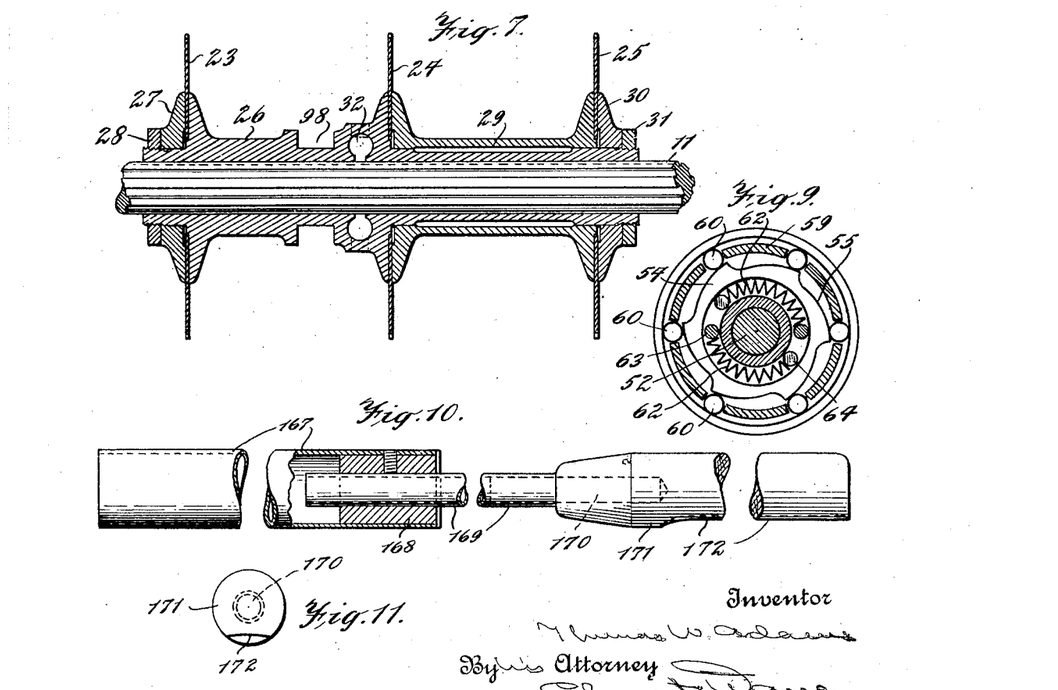
Fig. 7 is a sectional elevation of the cutter devices.
Fig. 9 is a sectional end elevation of one element of the clutch mechanism.
Fig. 10 is an elevation, partly in section, of a modified form of mandrel for supporting the tubing.
Fig. 11 is an end elevation of the forward end of the mandrel shown in Fig. 10.

The cutters, preferably in the form of disk saws, are, in the machine exemplified in the drawings, three in number, to wit, 23, 24 and 25, spaced at intervals on a sleeve 26, which latter is slidably mounted for longitudinal movement on the arbor 11 and has a splined connection with the latter to be rotated, as shown in Fig. 7. These saws are spaced apart a distance equal to the length of the sections of tubing to be cut and are securely held in such spaced relation by the particular mechanism illustrated in Fig. 7. Saw 23 is mounted on a shouldered flange near one end of sleeve 26 and locked in position by washer 27, which, in turn, is secured by a set nut 28 threaded to the end of the sleeve. The middle saw 24 is mounted upon a shouldered flange in the mid section of the sleeve 26 and is held in position by one flange of a spool-like thimble 29, the other end flange of said thimble being provided with a shoulder to receive the saw 25, which is similarly locked in position by a washer 30 and set nut 31. Preferably the supporting sleeve is provided with an annular chamber 32 to receive a supply of lubricant to insure an easy sliding movement of the cutting mechanism on the supporting arbor 11.

Loosely journaled on shaft 8 is a double pulley comprising members 33 and 34, the former being connected by a belt 35 to pulley 5 on the shaft of motor 4 and the member 34 being connected by a belt 36 to a pulley 37 fast to the cutter arbor 11. The belt 35 is provided wth a suitable belt tightener to maintain the proper driving tension on said belt at all times, said belt tightener, as illustrated in Fig. 2, comprising a pulley 38 mounted on spindle 39 journaled in a swinging bracket 40, to which is connected a tension spring 41 connected by an adjusting rod 42 to a bracket 43 secured to the under face of the table 1, said rod being held in its adjusted position by means of set nuts 44. It will be noted that this particular coordination of parts insures the continuous drive of the cutters so long as the motor 4 is operated, with the cutter arbor in its lowermost position and the saws or cutters out of contact with the tubing carried by the mandrel, but adapted to be projected into the path of travel of the tubing and to travel with the tubing in the cutting operation, as will be hereinafter explained.

Journaled in a supporting frame 45 and in bearing bracket 46 on the under side of the table 1 is a shaft 47 (see Fig. 1), upon which is fastened a pulley 48, which is connected by a belt 49 to drive pulley 6 on the shaft of motor 4, so that said shaft 47 is continuously rotated by the motor 4. Keyed to the shaft 47 within the frame 45 is a worm 50, which meshes with a worm gear 51 fast to a cross-shaft 52 journaled in said frame 45, said cross-shaft, therefore, being continuously driven by shaft 47. Also keyed to the shaft 52 is one member 53 of a clutch mechanism, comprising a cup-like element adapted to be intermittently coupled with its mating clutch 54, which latter comprises a generally disk-shaped head provided with peripheral cam surfaces 55, said head being formed as an extension of a sleeve 56 loosely journaled on shaft 52. Loosely mounted on the sleeve 56 is a collar-like element 57 having an enlarged head 58 provided with a flange 59, which is interposed between the rim of clutch member 53 and the edge of clutch member 54, said flange 59 being provided with pockets or recesses in which are mounted balls or rollers 60, which are adapted to roll on the cam surfaces 55 of the clutch member 54, each of said balls or rollers being acted upon by a spring 61, tending to force the balls or rollers toward the high ends of the cam surfaces 55. The inner face of the head 54 on sleeve 56 is provided with an annular groove in which are mounted springs 62, 62, each spring being confined between a pin 63 secured in the bottom of the groove, and a pin 64 secured to the inner face of member 58, the springs 62 tending to rotate said members 54 and 58 relatively to each other. Formed integrally with the collar section 57 is a flange 65 having diametrically oppositely disposed lugs 66, 67, which constitute stop devices, which, when engaged by an abutment, cause the cooperating clutch members 53 and 54 to disengage, by first arresting the movement of collar 57 and the head member 58 thereof which moves the balls or rollers down the cam surfaces 55, thereby disengaging the clutch members 53 and 54. The inertia of the clutch member 54 and the sleeve 56 of which it forms a part, causes these members to rotate a short distance after the movement of collar 57 has been arrested, which movement has the effect of compressing the springs 62, which are held under such compression by means of a flange 68 formed integrally with the sleeve 56 and provided with opposite notches 69 and 70, one or the other of which is adapted to be engaged by a roller 71, journaled in a clevis slide 72 mounted in an arm 45' of housing 45, said slide being held in yielding engagement with the flange 68 by means of the compression spring 73. The function of the springs 62 is to initiate the clutch engaging operation, after lug 66 or 67 on collar 57 has been disengaged from its retaining detent, the stored energy of the said springs serving to impart a partial rotation to collar 57 and head 58, the rim 59 of the latter operating to move the balls or rollers 53 into engagement with the high portions of the cam surfaces 55, thereby connecting clutch members 53 and 54.

The object of providing the collar 57 with two stop lugs 66 and 67 and the flange 68 with two notches 69 and 70 is to secure the disengagement of the clutch members at the end of each half revolution, for reasons to be hereinafter explained.

Figure 4:
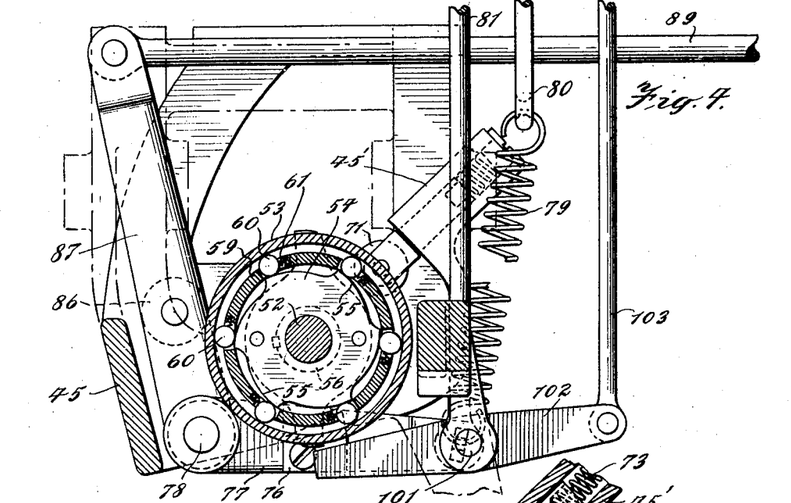
Fig. 4 is an enlarged elevation, partly in section, of certain of the operating and controlling mechanisms.
Figures 4A, 4B:
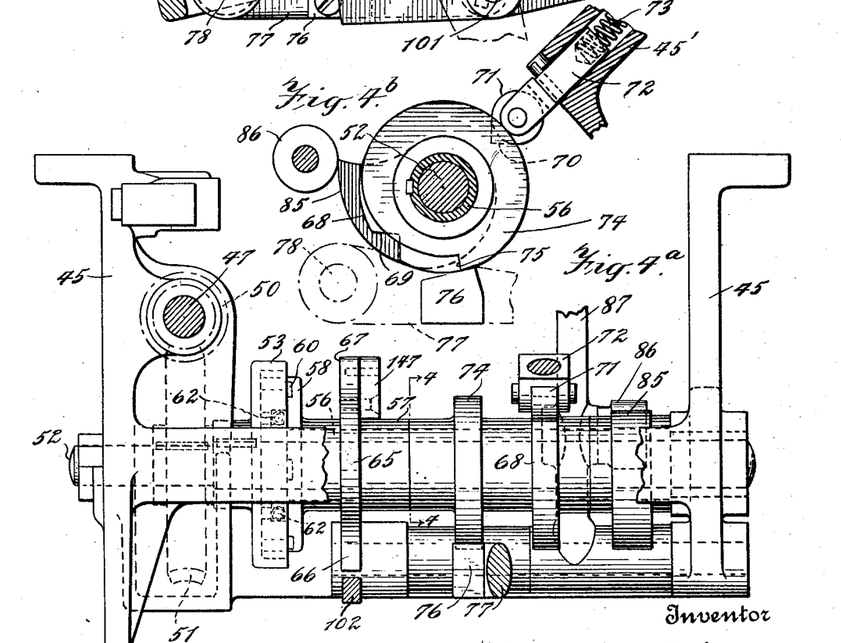

Keyed on the sleeve 56 is a cam 74 having a shoulder 75. Engaging the peripheral edge of said cam 74 is a lug 76 secured to a lever 77 pivoted on a shaft 78 mounted in the frame work parallel with the shaft 52. Connected to the outer end of the lever 77 is a spring 79 anchored at its upper end to an adjustable eye 80 secured to the table 1. Also secured to the outer end of lever 77 is a lift rod 81, which latter at its upper end is secured to one of the swinging arms 10 of the arbor frame by an adjustable connection comprising a screw collar 82 and a slotted rod section 83, the elongated slot of which is engaged by a cross pin 84 secured to member 10, as shown in Figs. 1, 2 and 3, these parts being so arranged that, when the lug 76 engages the high part of cam 74, as shown in Fig. 4b, the saws are held in their lower position out of the path of movement of the tubing, but, as soon as the lug 76 drops off of the high part of the cam onto the low portion thereof, spring 79 rocks lever 77, elevates rod 81 and swings the frame carrying the saw arbor upward until the saws are projected into the path of travel of the tubing. The purpose of the pin and slot connection between the rod 81 and the arm 10 of the swinging arbor frame is to permit the two half revolutions of the clutch to be effected during each cutting operation, as will be hereinafter explained.

Also fast on sleeve 56 is a cam 85, the rise of which is gradual through substantially one hundred and eighty degrees and terminates in a high point which drops off quickly to the hub section, which is substantially concentric with the sleeve 56. This cam 85 engages a roller 86 journaled on a stud mounted on lever 87, which is pivoted on shaft 78. The upper end of this lever 87 is connected by a horizontally extending rod 89, which passes through a block 90, swivelled in the clevis end of a rock lever 91, the other end of which is pinned to the end of a vertical shaft 92 journaled in a vertical bearing 93 formed in bracket 9. Pinned to the upper end of the shaft 92 is a cap piece 94 having an eye at its top to receive a cross pin 95 on the ends of which pin are mounted the forked ends of lever 96, the forward end of which latter is provided with a fork carrying blocks 97, which engage an annular groove 98 in sleeve 26 carrying the saws. This particular coordination is designed to return the gang of saws to its initial position after each cutting operation, when the high part of cam 85 swings the lever 87 and causes rod 89 to actuate lever 91, which, in turn, rocks shaft 92 and lever 96 connected thereto to slide the sleeve carrying the saws on saw arbor 11. The swivel connection between the lever 96 and the cap 94 connected to shaft 92 permits the lever 96 to follow the movement of the saw arbor toward and away from the path of travel of the tubing.

In order to ease the return of the gang of saws to its initial and inoperative position, there is mounted on rod 89 a helical spring 99 held in compression between the block 90 on lever 91 and set nuts on the end of the rod, which provides a yielding connection between the rod and lever 91 and permits the rod to gradually take up the return movement of the saws without undue shock or jar. This is found desirable, in view of the fact that the action of the cam 85 is positive and would cause the lever 87 to operate at a more rapid rate than the gang of cutters could readily follow, because of the inertia of the gang of cutters moving longitudinally of its supporting arbor. It will be seen, therefore, that the pull exercised on rod 89 by cam 85 and lever 87 first gradually compresses the spring 99, and as gradually initiates the return movement of the cutters, the final movement of the cutters being arrested by a stop collar 92 pinned to shaft 89 and which is engaged by the swivel lug 90 through which the rod passes.

Pivoted to a bracket extension of the housing 45 at 101 is a rock lever 102, the free end of which is adapted to engage lug 66 or 67 to disengage the members of the clutch and to permit the clutch members to be automatically engaged, when the end of said lever is moved out of engagement with lug 66 or 67. The opposite end of lever 102 is connected to a lift rod 103, which is attached at its upper end to a bell crank 104 mounted upon bracket 105 secured to a bar 106 running longitudinally of the machine in general parallelism with the mandrel, said bar being secured to pedestals 107, 107 fast to the table 1. Said bell crank lever is acted upon by a spring 108 attached to an extension of bracket 109, which spring normally tends to rock the bell crank in a direction to swing the free end of lever 102 into the path of movement of lug 66 or 67. Connected to the upper end of bell crank 104 is a rod 110, which passes through and is secured in an eye 111 of a lever 112 pivoted at 113 to a bracket 114, which bracket forms an upward extension of an adjustable slide 115 mounted on bar 106.

The slide 115 carries the trip mechanism which operates the clutch releasing lever 102 and which also, in the machine exemplified, constitutes a part of the mechanism for automatically discharging or stripping the cut sections of the tubing from the mandrel after each cutting operation. The trip plate per se constitutes one of three radial arms or blades 116, 116′, 116″, connected to a hub section 117 journaled on a pin 118 secured to the bracket 114, said hub section having a flange 119 thereon provided with a lug 120, diametrically opposite the arm 116, which lug is adapted to engage the lower end of lever 112, when the trip plate 116 is swung outwardly by the end of the tubing passing through the machine, thereby causing lever 112 to swing on its pivot 113 causing rod 110 to swing to the right, as shown in Figs. 1 to 5, rocking bell crank 104 to cause rod 103 to swing rock lever 102, so that the free end of the latter disengages lug 66 or 67, thereby permitting the effective engagement of the clutch member 53 fast to shaft 52 and clutch member 54, which serves to rotate the sleeve 56 and its associated elements, the rotation of said member 56 being arrested after each half revolution by the engagement of the free end of lever 102 with the opposite lug 66 or 67 as the case may be, which has the effect of disengaging the loose member of the clutch and arresting the rotary movement of sleeve 56. As indicated, the trip mechanism also constitutes a component part of the stripping mechanism for discharging the sections of the tubing, which is accomplished by causing the blades 116′, 116″ and 116 to engage the severed sections in sequence and flip them off of the end of the mandrel. This operation is effected by the mechanism more particularly shown in Figs. 5 and 5ª, in which 123 indicates a plate secured to the hub section of the trip device, which plate is provided with three peripheral cam surfaces 123′ separated by notches 123″, the peripheral edge of the plate being engaged by a roller 124 mounted on the end of a lever 125 pivoted at 126 to slide 115, the lever being held in adjustable pressure contact with the periphery of the cam plate by a spring 127 connected to the mid section of the lever 125 and anchored to an adjusting screw 128 mounted in a bracket 129 extending upwardly from the slide 115, the engagement of the roller 124 with the cam surfaces of the plate 123 serving, through the action of spring 127, to complete successive rotatory movements of one hundred and twenty degrees to the hub 117 and, therefore, to the blades 116, 116′, 116″ secured thereto, the initial rotary movements being effected by the engagement of the advancing tubing with blades 116, 116′ and 116″. It will be noted that the coaction between the spring impelled lever 125 and the cams on plate 123 accelerates the successive rotary movements of the trip mechanism, so that the blades flip from point to point with a quick snap action, which is effective in kicking the several sections of the tubing off of the end of the mandrel, thereby speeding up the stripping of the sections and also insuring a rapid return of the trip plate or target 116 to its initial position to be engaged by the end of the uncut tubing, whereby the operation of the machine as a whole may be speeded up.

Pivoted on the bracket extension of the pedestal 107, which is adjacent the saw arbor, is an angular lever 130 acted upon by tension spring 131 anchored to the table top, said lever carrying a latch plate 132 adapted to cooperate with a latch plate 133 secured to the side of the adjacent arm 10 of the swinging arbor frame, the engagement of the latch plate serving to hold the saw arbor frame in its upper position with the saws in the path of travel of the tubing, after the arbor frame has been swung to this position.

Connected to the lever 130 is a rod 134 (see Figs. 1, 5 and 6), the opposite end of which is connected to a bell crank 135 pivoted on a bracket on the table top 1, the other end of the bell crank engaging a collar 136 adjustably mounted on pull rod 103, which latter actuates the trip lever 102 controlling the clutch mechanism. To the upper end of the lever 130 is pivoted one end of a rod 137, which passes through a perforated lug 97′ secured to the upper side of arm 96, which latter serves directly to return the saws to their initial inoperative position, as hereinbefore explained. Adjustably mounted on the rod 137 is a collar or abutment 139, which, as the arm 96 is swung by the movement of the cutters with the tubing during the cutting operation, is engaged by lug 97' at the end of the tube cutting operation, thereby swinging lever 130 to disengage latch plates 132 and 133, so as to permit the cutter arbor frame to drop, and also to move rod 134 to the right, as shown in Fig. 1, thereby rocking bell crank 135, raising rod 103 and swinging trip lever 102 out of engagement with the lug 67 to cause a reengagement of the clutch mechanism and thereby effect a second half revolution of the loose clutch member, whereby all of the parts are restored to normal operative position.

In order to lock the gang of saws in its initial or inoperative position, there is secured to the under face of the swinging arm 96, which returns the saws to such position, a latch plate 140, which is adapted to be engaged by a latch 141 pivoted to a bracket 142 secured to pedestal 107, the latch having a perforated angular extension 143, through which passes a stud 144 mounted on pedestal 107, which stud carries a compression spring 145 normally tending to force the latch into engagement with plate 140, the position of the latch being adjusted by set nuts 146 on the outer end of the stud. It will be seen, therefore, that, when the arm 96 reaches the end of its movement in returning the cutters to their initial position and after the cutter frame has been lowered, the latch plate 140 rides over the nose of latch 141 and snaps behind said nose. When, however, the cutter frame is again swung upwardly to bring the saws into the path of travel of the tubing, the arm 96 moves upward therewith and disengages the latch plate 140 from latch 141.

Figures 5, 5A, 5B, 5C:
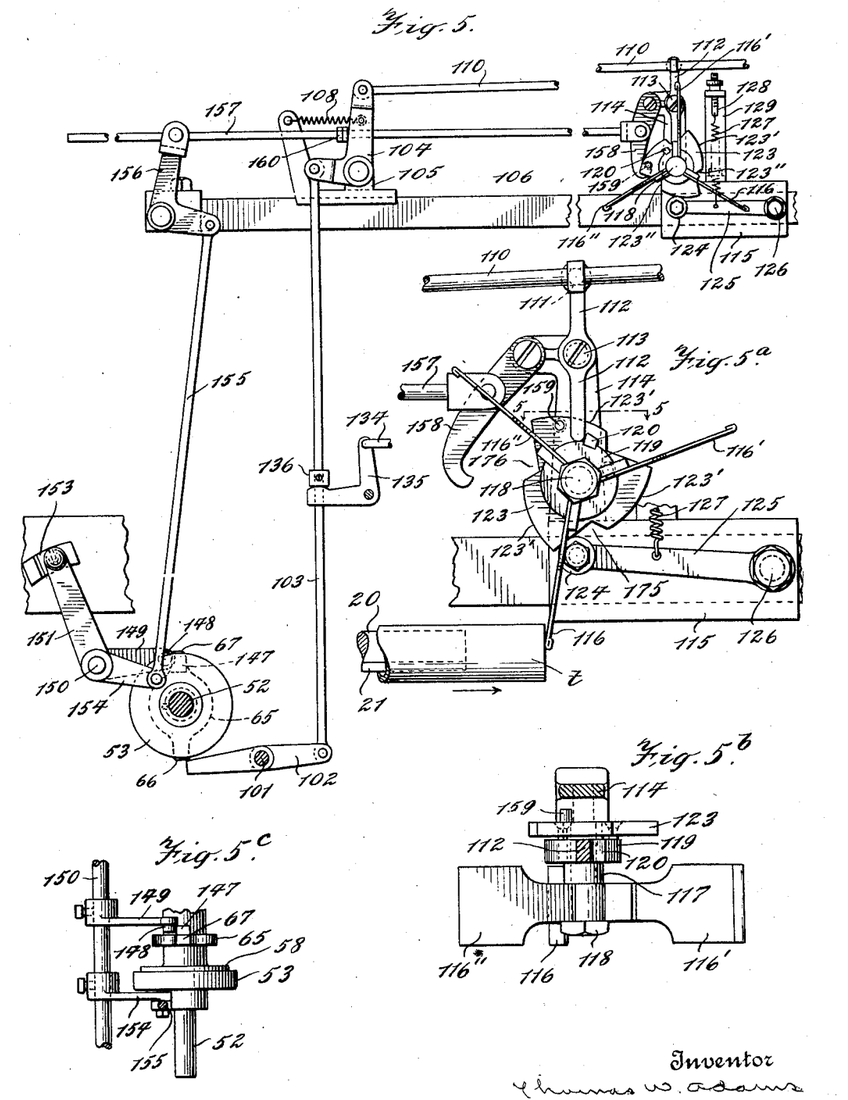
Figures 6, 8:
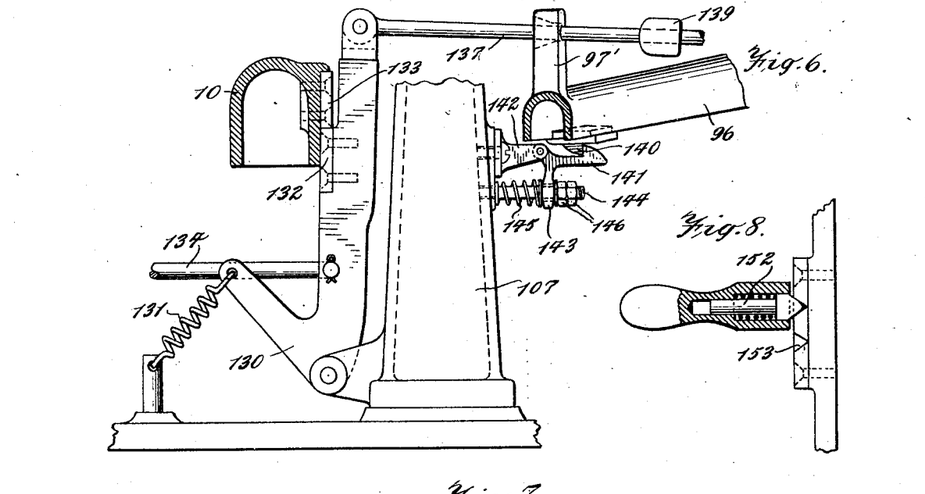
Fig. 6 is an enlarged fragmentary side elevation, partly in section, of certain of the operating and controlling devices.
Fig. 8 is a detail view, partly in section, of the handle for operating the lockout mechanism.

Under certain conditions, it is found desirable and necessary to suspend the cutting operation, as, for example, when the tubing is defective or the machine becomes clogged and to permit the defective tubing to be run through the machine without being cut. To effect this result, a special lockout mechanism to prevent the engagement of the clutch members and also to latch the trip mechanism and stripping means in inoperative position and permit the free passage of the tubing past the trip mechanism, is provided, this lockout mechanism being effective after the completion of a cutting operation. Secured to the flange 65 on collar 57 (see Fig. 5$^c$) and in the rear of lug 67 on said flange is a stop lug 147, which is adapted to be engaged by a pin 148 on the end of a lever 149 mounted on shaft 150, which shaft is journaled in bearings in the housing 45. Connected to the shaft is a hand crank 151 provided with a spring latch pin 152 cooperating with a notched retaining plate 153 secured to the side of the machine frame. When the crank handle is swung in a direction to move pin 148 in the path of movement of lug 67, the engagement of these parts effects the disengagement of the clutch members in the same manner as the engagement of the end of trip lever 102, and prevents the further operation of the clutch mechanism until the handle 151 is moved to the opposite position, which swings the pin 148 out of the path of movement of the lug 147. Also fixed on the shaft 150 is a crank arm 154 connected by a rod 155 with a bell crank 156 mounted on bar 106, the upper arm of the bell crank being pinned to a pull rod 157, the opposite end of which is pin-connected with a swinging latch 158 pivoted to the bracket 114, the lower hook end of the latch 158 being adapted to engage a pin 159 on the rear face of the cam plate 123 and serving to arrest the rotatory movement of said cam plate and the radial arms of the trip and stripping devices in the position shown in Figs. 1 and 5, when all of the radial arms are out of the path of movement of the tubing. Secured to the rod 157 is a finger 160 adapted to engage bell crank 104 and thereby operate the trip lever 102 and tripping the clutch at the same time the safety device is thrown in.

The gang of saws, in the cutting operation, moves forward by engagement with the tubing and, in order to relieve the strain imposed on the tubing by the engagement of the saws, there is provided a spring drum 161 rotatably mounted on the under side of the table, which drum is connected by a band or ribbon 162 with the pin which connects rod 89 with rock lever 87, so that, when said lever is moved by cam 85 to return the saws to their initial position, the band 162 rotates the spring drum 161 to wind up the spring. When the lever 87 is released by the disengagement of the roller 163 thereon with the high part of the cam 85, the stored energy in the spring carried by the drum 161 will, therefore, be applied to rod 89 in the direction of movement of the saws with the tubing, thereby taking a large part of the load of moving the saws during the cutting operation and permitting the saws to be carried forward with the tubing at a uniform rate, and thereby avoiding the possibility of the saws forming jagged cuts in the tubing.

Mounted on the top of the table 1 in front of and below the saws is a bar 164 which carries the saw guard 165 and the dust discharge tube 166, as indicated in Fig. 2.

The mandrel shown in Figs. 3$^a$ and 3$^b$ is designed for use with smaller sized tubing and, under certain circumstances, it is found desirable to employ a somewhat lighter construction of mandrel for the larger sized tubing and such latter type of mandrel is illustrated in Fig. 10. 167 indicates the end of the tubular mandrel upon which the tubing is formed, the forward end of which is provided with a cored plug 168 in which is adjustably secured by set screw a tubular extension 169 in the end of which is secured a pin 170 carrying a wooden mandrel section 171, the lower portion of which is cut away, as indicated at 172, to form an arcuate under surface, the curvature of which corresponds with that of the periphery of the saws, to serve the same purpose as the arcuate under surface 22 of the mandrel first described.

The operation of the machine as described is as follows: The tubing is fed into the machine, either from the tube forming mechanism or from any other source, over the mandrel, the latter being maintained in proper feeding position by the guide member 13, and extending through the cutting machine to a point just short of the vertical position of the trip arm 116, so that the latter will clear the end of the mandrel, but the mandrel will nevertheless constitute an effective support for the tubing during the entire cutting operation and for the cut sections of the tubing until the latter are stripped from the forward end of the mandrel. When the advance end of the tubing engages the trip plate 116 as shown in Fig. 5ª, the latter is swung forward, thereby imparting a partial rotation to the hub 117 and the flange 119 carrying lug 120 and the cam plate 123. The lug 120 engages the lower end of lever 112, rocking the latter and exercising a forward pull on rod 110 connected to said lever, which rocks bellcrank 104, which moves rod 103 upward and rocks lever 102, so that its end is moved out of engagement with lug 66, thereby permitting clutch member 54 to be automatically engaged with clutch member 53 fast to shaft 52, as hereinbefore explained. This causes a rotation of sleeve 56 and the elements carried thereby. At this time, the high part of cam 85 on sleeve 56 passes out of engagement with roller 86 on lever 87, which will permit the lever 87 to move forward in the direction of movement of the tubing, so that the saws will be free to travel with the tubing, when they are engaged therewith. Immediately after the freeing of the lever 87, the lug 76 on rock lever 77 will drop behind shoulder 75 on cam 74 and permit spring 79 to move the outer end of lever 77 upward and with it rod 81, thereby swinging the frame carrying the saw arbor upward until the saws are engaged with the tubing. Upon completion of the upward movement of the saws, the latch member 132 on lever 130 engages latch member 133 on arm 10 of the saw arbor frame and thereby locks the saws in their upper position until the cutting operation has been completed. The saws, which are constantly driven through the belt connection of the arbor 11 with the drive pulley 5, move with the tubing during the cutting operation, the normal drag of the saws on the tubing being counteracted by the spring drum 161, as hereinbefore explained. The action of the spring 79 is to move the saws quickly into engagement with the tubing immediately after they have been freed by the release of lever 87 by the high portion of the cam 85. In this connection it is to be noted that the release of the lever 87 by the cam 85 in advance of the release of the saw lifting lever 77 by the cam 74, renders the spring 161 operative to move the saws forward in the direction of travel of the tubing at or before the cutting engagement of the saws with the tubing; in this way avoiding possibility of the saws forming jagged or tearing ends in the tubing such as would result if the dead weight of the saws had to be taken up by the advancing tubing upon the sudden engagement of the saws therewith.

It will be noted that the trip mechanism is adjustable along the bar 106, so that the trip plate 116, which is engaged by the advancing end of the uncut tubing, may be set, so that the saws may be moved into engagement with the tubing at the proper time to determine the length of the section of tubing between the outer saw and the trip plate at the instant the latter is effective in tripping the clutch into active engagement and thereby determining the length of the first section of tubing to accurately agree with the other sections to be cut and which is determined by the distance between the respective saws.

The machine, as described, is constructed so that the clutch member 54 will be stopped at the end of each half revolution. The reason for this particular operation is that, in cutting very large tubes, the saws require more time to effect the cut, due to the fact that the larger tubes rotate more slowly on the mandrel and the helical turns are longer than those of the smaller tubes, and, therefore, a relatively longer time is required to effect a complete severance of the sections of the larger tubing. For this reason, the lug 67, carried by the collar-like member 57, is arranged approximately one hundred and eighty degrees from the point 66, so that the engagement of the lug 67, by the end of trip lever 102, after the latter has been returned to its position by spring 108, operates to stop the clutch at a half revolution with all of the adjustments in proper relation to permit the saws to continue their free forward movement with the tubing and sufficient time will be allowed to permit the saws to finish the cuts in the larger tubing.

The completion of the cutting operation is determined by the adjustment of the collar 139 on rod 137 and the engagement of said collar by the lug 97' on the lever 96, which moves with the saws and which is also instrumental in returning the saws to initial position. This collar 139 is so adjusted on the rod 137 as to be engaged by the lug 97' as aforesaid, immediately after the saws have completed the severance of the three sections from the end of the tubing. The movement of the rod 137 by the engagement of collar 139 by lug 97' swings lever 130 to disengage latch members 132 and 133, thereby permitting the frame carrying the saw arbor to drop to its lower position, which action is rendered possible by reason of the fact that the cam 74 has made a half revolution with the first operation of the clutch, so that the rod 81 has been dropped to its lower position, the dropping of the rod being permitted by reason of the elongated slot in the adjustable member 83 on the end of the rod engaging the pin 84 secured to the arm 10 of the saw arbor frame. The rocking movement of the lever 130 actuates rod 134 to rock bell crank 135 and through collar 136 to lift rod 103, thereby disengaging the forward end of lever 102 from lug 67, permitting the automatic engagement of the clutch, so that the second half revolution of the sleeve 56 is effected and the parts carried thereby return to normal position, as indicated in Fig. 4b. The second half revolution of the cam 85 is effective in moving lever 87 to the left, as indicated in Fig. 4, thereby causing rod 89 to move the gang of saws along arbor 11 to initial inoperative position ready to take up the next cycle, the return of the gang of saws to said initial position being effected by the cushioning action of spring 99 on rod 89, as hereinbefore explained. When the saws reach their initial position, latch plate 140 on the arm 96 snaps behind latch 141 and the saws are held against rebound by the latch until freed by the upward movement of the saw arbor frame in the next cycle of operation.

As hereinbefore stated, the saws during the cutting operation move forward on their supporting arbor with the tubing and, in the particular machine shown, sever three sections from the end of the tubing simultaneously of exactly the same predetermined length, the length of the first section being determined by the adjustment of the trip mechanism on bar 106 and the length of the other sections being fixed by the spacing of the saws. As the advancing end of the tubing, during the cutting operation, forces trip arm 116 forward in a rotatory path, the roller 124 on arm 125 rides out of the notch 175 in the cam plate onto the adjacent cam section, which is given a curvature so that the upward pressure of the roller due to the spring 127, will impart a further rotatory movement to the three radial arms carried by the hub 117, as explained hereinbefore, thereby causing arm 116'' to engage the first cut section of the tubing and knock the same off of the mandrel. The roller 124 on lever 125 then engages the notch 176 adjacent arm 116'' and the rotatory trip and stripping arms are arrested for a moment with arm 116'' in position to be engaged by the front edge of the second cut tube section, the advance of which initiates another rotatory movement of the arms until the roller 124 rides on the second cam section, to wit, that immediately following arm 116'', and the three arms are again rotated in unison until they complete a movement of approximately one hundred and twenty degrees, when arm 116' engages the second tube section and knocks the same from the mandrel. This operation is repeated by the third cut section of tubing engaging arm 116', thereby bringing trip arm 116 into engagement with the third section of tubing and stripping the same from the mandrel, the arm 116 being brought to rest in the position shown in Fig. 5a somewhat in advance of the end of the uncut tubing ready to be engaged thereby to initiate the next cutting operation.

As hereinbefore stated, it is desirable at times to suspend the cutting operation in order to discharge a section of defective tubing through the machine without cutting the same and, in order to bring this about, the handle 151 is moved to the position shown in Fig. 5, so that the pin 148 on arm 149 lies in the path of lug 147 on flange 65 of the collar-like member 57 and to the rear of stop lug 67. The operation of handle 151 also rocks lever 154, which, through pull rod 155, bell crank 156, pull rod 157 and collar 160, rocks bell crank 104, lifting rod 103 and rocking lever 102 to disengage lug 66, which permits the engagement of the clutch members to initiate a rotation of the member 54, sleeve 56 and collar 57, which movement is immediately arrested, however, by the engagement of pin 148 with lug 67 and the machine is thus locked out or in inoperative position so long as handle 151 is retained in the adjustment indicated. The movement of handle 151 also effects the locking of the trip and stripping mechanism in inoperative position, as hereinbefore explained; that is to say, arm 154 lifts rod 155 which rocks bell crank 156, moving pull rod 157 to the right, as shown in Fig. 5, and forcing the latch lever or gag 158 into engagement with the pin 140 on the cam plate 123 as soon as said pin is moved by the rotation of the trip plate by the advancing tubing, the position of the radial arms of the trip and stripping mechanism being that indicated in Figs. 1 and 5 and is shown in locked position completely above and out of the path of travel of the defective tubing passing through the machine. In order to restore the machine to operative condition, it is only necessary to swing the handle 151 to move the pin 148 out of engagement with stop lug 147 and, as rock lever 102 is out of stopping engagement with the opposite lug 66, the clutch members are automatically engaged and a new cycle of cutting operations is begun, it being understood that the return of handle 151 to initial position also releases the latch or gag 158 from engagement with the plate 159, thereby restoring the trip mechanism to normal position.

While the machine as illustrated and described is designed primarily to cut three sections of uniform length from tubing fed continuously through the machine, it will be understood that the invention is not limited to the cutting of this particular number of sections, as the machine may be readily adapted to cut two or four sections, if desired. Also, while the machine is constructed to effect two successive half revolutions of the loose member of the cam and associated elements during each cutting operation, it will be understood that the machine, under certain circumstances, may be constructed and arranged to effect a single complete revolution of the loose cam member during each cutting operation by omitting the lug 67, but, as indicated, it is desirable, in cutting relatively large tubes, to effect the two half revolutions aforesaid, in order to allow sufficient time for the saws to make a complete clean severance of sections from the larger tubing.

What I claim is:

1. A tube cutting machine comprising means for receiving and guiding a travelling tubing, means for simultaneously cutting multiple sections from the tubing, means actuated by the advance end of the tubing for controlling the operation of the cutting means, and means operated by the successive cut sections during their discharge from the machine to return said controlling means to its normal operative position for actuation by the advancing end of the uncut tubing.

2. A tube cutting machine comprising means for receiving and guiding a travelling tubing, means for simultaneously cutting multiple sections from the tubing, a trip plate actuated by the advance end of the tubing for controlling the operation of the cutting means, and means operated by the successive cut sections during their discharge from the machine to return said trip plate to its normal operative position for actuation by the advancing end of the uncut tubing.

3. A tube cutting machine comprising means for receiving and guiding a travelling tubing, means for simultaneously cutting multiple sections from the tubing, a rotary trip plate actuated by the advance end of the tubing for controlling the operation of the cutting means, and means operated by the successive cut sections during their discharge from the machine to return said trip plate to its normal operative position for actuation by the advancing end of the uncut tubing.

4. A tube cutting machine comprising means for receiving and guiding a travelling tubing, means for simultaneously cutting multiple sections from the tubing, a rotary trip plate actuated by the advance end of the tubing for controlling the operation of the cutting means, and means including radial arms disposed about the axis of said plate operated by the engagement with said arms of the successive cut sections during their discharge from the machine to return the trip plate to its normal operative position for actuation by the advancing end of the uncut tubing.

5. A tube cutting machine comprising means for receiving and guiding a travelling tubing, means for simultaneously cutting multiple sections from the tubing, a trip plate actuated by the advance end of the tubing for controlling the operation of the cutting means, and means operated by the successive cut sections during their discharge from the machine to return said trip plate to its normal operative position for actuation by the advancing end of the uncut tubing, said last mentioned means including a camming device on the axis of the trip plate and means cooperating directly with said camming device to impart a step-by-step movement to the trip plate.

6. A tube cutting machine comprising means for receiving and guiding a travelling tubing, means for simultaneously cutting multiple sections from the tubing, a trip plate actuated by the advance end of the tubing for controlling the operation of the cutting means, and means including said trip plate for sequentially discharging the cut sections during the interval between successive engagements of the tubing with the cutting means.

7. A tube cutting machine comprising means for receiving and guiding a travelling tubing, means for simultaneously cutting multiple sections from the tubing, a rotary trip plate actuated by the advance end of the tubing for controlling the operation of the cutting means, and means including said trip plate and radial arms disposed about the axis of said plate for sequentially engaging and discharging the cut sections in the interval between successive engagements of the tubing with the cutting means.

8. A tube cutting machine comprising means for receiving and guiding a travelling tubing, means for simultaneously cutting multiple sections from the tubing, a rotary trip plate actuated by the advance end of the tubing for controlling the operation of the cutting means, and means including said trip plate and radial arms disposed about the axis of said plate for sequentially engaging and discharging the cut sections in the interval between successive engagements of the tubing with the cutting means, a camming device on the axis of the trip plate, and a spring actuated lever cooperating with said camming device to impart a step by step movement to said plate and arms.

9. A tube cutting machine comprising means for directing a travelling tubing through the machine, multiple cutters movable with the tubing for severing the latter into sections of predetermined length, means including a trip plate actuated by the advance end of the uncut tubing to control the movement of the cutters into engagement with the tubing, means actuated by the movement of the cutters with the tubing to control the return of the cutters to initial inoperative position after each multiple cutting operation, and means including said trip plate for discharging the cut sections after each cutting operation.

10. A tube cutting machine comprising means for directing a travelling tubing through the machine, multiple cutters movable with the tubing for severing the latter into sections of predetermined length, means including a trip plate actuated by the advance end of the uncut tubing to control the movement of the cutters into engagement with the tubing, means actuated by the movement of the cutters with the tubing to control the return of the cutters to initial inoperative position after each multiple cutting operation, and means including said trip plate for sequentially discharging the cut sections after each cutting operation.

11. A tube cutting machine comprising a mandrel for receiving and directing a travelling tubing through the machine, multiple rotary cutters mounted for transverse and parallel movements relative to the travel of the tubing, means including a trip plate actuated by the advance end of the uncut tubing to control the movement of the cutters into engagement with the tubing, means actuated by the movement of the cutters with the tubing to control the return of the cutters to initial inoperative position after each multiple cutting operation, and means including said trip plate for stripping the cut sections from the mandrel after each cutting operation.

12. A tube cutting machine comprising a mandrel for receiving and directing a travelling tubing through the machine, multiple rotary cutters mounted for transverse and parallel movements relative to the travel of the tubing, means including a trip plate actuated by the advance end of the uncut tubing to control the movement of the cutters into engagement with the tubing, means actuated by the movement of the cutters with the tubing to control the return of the cutters to initial inoperative position after each multiple cutting operation, and rotary means including said trip plate for engaging and stripping the cut sections successively from the mandrel.

13. A tube cutting machine comprising means for receiving and guiding a travelling tubing, means for simultaneously cutting multiple sections from the tubing, means including a trip plate actuated by the advance end of the tubing for controlling the operation of the cutting means, and means including said trip plate operative both to return the controlling means to its normal position for actuation by the advancing end of the uncut tubing and to discharge the cut sections during the intervals between the successive engagements of the uncut tubing ends with the controlling means.

14. A tube cutting machine comprising a mandrel for receiving and directing a travelling tubing through the machine, multiple cutters movable into contact with the tubing for severing the travelling tubing into sections of predetermined length, means including a pivoted trip plate for effecting the operative movements of the cutters, means for returning the cutters to inoperative position, and means for successively stripping the cut sections from the mandrel, the stripping means including said pivoted trip plate engaged by the advance end of the tubing, spaced radial arms on the axis of the trip plate, and a spring actuated camming device for intermittently rotating said trip plate and arms, whereby the arms will successively engage and strip the advance cut tube sections and the trip plate will strip the last cut section from the mandrel.

15. A tube cutting machine comprising a mandrel for receiving and directing a travelling tubing through the machine, a swinging frame including an arbor parallel to said mandrel, multiple rotary cutters slidable on the arbor, a motor for driving said arbor, a spring actuated rod for swinging the frame to engage the cutters with the travelling tubing, a jack shaft driven by said motor, a clutch on said shaft having one member fast to the shaft and the other loose thereon, a cam on the loose clutch member controlling the spring actuated rod to raise and lower the cutter frame, a rock lever cooperating with a detent on the loose clutch member to disconnect the clutch, a trip plate located in the path of movement of the tubing, connections between said trip plate and said rock lever to disengage the latter from the detent and effect engagement of the clutch members, a second cam on the loose clutch member, connections between said second cam and the cutters to return the latter to initial position, and means including said trip plate for stripping the cut tube sections from the mandrel.

16. A tube cutting machine comprising a mandrel for receiving and directing a travelling tubing through the machine, a swinging frame including an arbor parallel to said mandrel, multiple rotary cutters slidable on the arbor, a motor for driving said arbor, a spring actuated rod for swinging the frame to engage the cutters with the travelling tubing, a jack shaft driven by said motor, a clutch on said shaft having one member fast to the shaft and the other loose thereon, a cam on the loose clutch member controlling the spring actuated rod to raise and lower the cutter frame, a rock lever cooperating with a detent on the loose clutch member to disconnect the clutch, a trip plate located in the path of movement of the tubing, connections between said trip plate and said rock lever to disengage the latter from the detent and effect engagement of the clutch members, a second cam on the loose clutch member, and connections between said second cam and the cutters to return the latter to initial position, the cams on the loose clutch member being timed and adjusted to free the cutters for sliding movement on the mandrel just prior to the engagement of the cutters with the tubing.

17. A tube cutting machine comprising means for directing a travelling tubing through the machine, a swinging frame including an arbor parallel with the movement of the tubing, cutting means slidable on the arbor, a motor for driving the arbor, a jack shaft driven by said motor, fast and loose clutch members on said jack shaft, means actuated by the advance end of the tubing to effect engagement of the clutch members, a cam on the loose clutch member controlling the movements of the cutter frame toward and from the tubing, and a second cam on the loose clutch member controlling the return movement of the cutting means, said cams being adjusted to release the cutting means for free sliding movement just prior to the engagement of the cutting means with the tubing.

18. A tube cutting machine comprising means for receiving and directing a travelling tubing through the machine, rotary cutting means mounted for transverse and parallel movements relative to the travel of the tubing, means controlled by the tubing operative to move the cutting means into the path of movement of the tubing, and means for returning the cutting means to initial inoperative position, said latter means being releasable just prior to the actuation of the means advancing the cutting means into the path of movement of the tubing.

19. A tube cutting machine comprising means for receiving and directing a travelling tubing through the machine, rotary cutting means mounted for transverse and parallel movements relative to the travel of the tubing, cam controlled means controlled by the tubing and operative to move the cutting means into the path of movement of the tubing, and cam controlled means for returning the cutting means to initial inoperative position, the controlling cams being timed to release the cutting means for free parallel movement with the tubing just prior to the engagement of the cutting means with the tubing.

20. A tube cutting machine comprising cutting means movable with the tubing and having a movable support, a constantly driven shaft, means operative to project the cutting means into the path of travel of the tubing including a fast and loose clutch connection with said shaft, mechanism controlling the clutch connection including a trip plate engaged by the tubing to initiate the operation of said controlling mechanism, and means actuated by the clutch connection to return the cutting means to initial position, said returning means being operative to release the cutting means for free movement with the tubing just prior to the operation of the projecting means.

21. A tube cutting machine comprising a mandrel for receiving and directing a travelling tubing through the machine, a swinging frame including an arbor parallel to said mandrel, multiple rotary cutters slidable on the arbor, a motor for driving said arbor, a spring actuated rod for swinging the frame to engage the cutters with the travelling tubing, a jack shaft driven by said motor, a clutch on said shaft having one member fast to the shaft and the other loose thereon, a cam on the loose clutch member controlling the spring actuated rod to raise and lower the cutter frame, a rock lever cooperating with a detent on the loose clutch member to disconnect the clutch, a trip plate located in the path of movement of the tubing, connections between said trip plate and said rock lever to disengage the latter from the detent and effect engagement of the clutch members, a second cam on the loose clutch member, and connections between said second cam and the cutters to return the latter to initial position, said connections including a rock lever engaging the cam, a rock arm connected to the cutters, a rod between said lever and arm and a cushioning spring on the end of the rod engaging the rock arm.

22. A tube cutting machine comprising cutting means movable with the tubing having a movable support, a constantly driven shaft, means operative to project the cutting means into the path of travel of the tubing including a fast and loose clutch connection with said shaft, the loose clutch member having oppositely disposed detents thereon, mechanism controlling the clutch connection including a trip plate engaged by the tubing to initiate the operation of said controlling mechanism and a rock lever cooperating with said detents to disengage each clutch member after each half revolution thereof, and means actuated by the clutch connection to return the cutting means to initial position, said returning means being operative to release the cutting means for free movement with the tubing just prior to the operation of the projecting means.

23. A tube cutting machine comprising means for receiving and guiding a travelling tubing, means for simultaneously cutting multiple sections from the tubing, means actuated by the advance end of the tubing for controlling the operation of the cutting means, and rotary means operative both to return the controlling means to its normal position for actuation by the advancing end of the uncut tubing and to discharge the cut sections during the intervals between the successive engagements of the uncut tubing ends with the controlling means.

24. A tube cutting machine comprising means for receiving and guiding a travelling tubing, means for simultaneously cutting multiple sections from the tubing, means actuated by the advance end of the tubing for controlling the operation of the cutting means, and means operated by the successive cut sections during their discharge from the machine both to return the controlling means to its normal position for actuation by the advancing end of the uncut tubing and to discharge the cut sections during the intervals between the successive engagements of the uncut tubing ends with the controlling means.

25. A tube cutting machine comprising means for receiving and guiding a travelling tubing, means for simultaneously cutting multiple sections from the tubing, a rotary trip plate actuated by the advance end of the tubing for controlling the operation of the cutting means, and means for returning said trip plate to its normal position for actuation by the end of the uncut tubing, said last mentioned means including radial arms disposed about the axis of said plate and operated by the engagement therewith of the cut sections during their discharge from the machine and which arms also operate during their rotation to eject the cut sections from the machine.

26. A tube cutting machine comprising means for receiving and guiding a travelling tubing, means for simultaneously cutting multiple sections from the tubing, a rotary trip plate actuated by the advance end of the tubing for controlling the operation of the cutting means, means including said trip plate and radial arms disposed about the axis of said plate for sequentially engaging and discharging the cut sections in the interval between successive engagements of the tubing with the trip plate, and means for imparting an accelerated or snap movement to the plate and arms at the time of their engagement with the cut sections.

27. A tube cutting machine comprising means for receiving and guiding a travelling tubing, means for simultaneously cutting multiple sections from the tubing, a rotary trip plate actuated by the advance end of the tubing for controlling the operation of the cutting means, means including said trip plate and radial arms disposed about the axis of said plate for sequentially engaging and discharging the cut sections in the interval between successive engagements of the tubing with the trip plate, and means, including a camming device on the axis of the trip plate and cooperating spring-pressed means, for imparting an accelerated or snap movement to the plate and arms at the time of their engagement with the cut sections.

In testimony whereof I affix my signature.

THOMAS W. ADAMS.